United States Patent [19]
Breunig et al.

[11] Patent Number: 6,055,472
[45] Date of Patent: Apr. 25, 2000

[54] ARRANGEMENT FOR DETECTING MOTOR-VEHICLE ROLL-OVERS

[75] Inventors: Volker Breunig, Heilbronn; Joachim Bauer, Oberstenfeld; Hans-Peter Lang, Pleidelsheim, all of Germany

[73] Assignee: Robert Bosch GmbH, Stuttgart, Germany

[21] Appl. No.: 09/142,645

[22] PCT Filed: Oct. 17, 1996

[86] PCT No.: PCT/DE96/02001

§ 371 Date: Sep. 11, 1998

§ 102(e) Date: Sep. 11, 1998

[87] PCT Pub. No.: WO97/33775

PCT Pub. Date: Sep. 18, 1997

[30] Foreign Application Priority Data

Mar. 13, 1996 [DE] Germany .................. 196 09 717

[51] Int. Cl.[7] .......................... B60R 21/13; B60R 21/32; G01P 9/00
[52] U.S. Cl. .............................. 701/45; 340/440
[58] Field of Search ................ 701/1, 45; 340/440; 280/734

[56] References Cited

U.S. PATENT DOCUMENTS 5,610,575  3/1997  Gioutsos .................... 340/429

FOREIGN PATENT DOCUMENTS

| | | |
|---|---|---|
| 430 813 | 6/1991 | European Pat. Off. . |
| 0 528 514 | 2/1993 | European Pat. Off. . |
| 0 662 601 | 7/1995 | European Pat. Off. . |
| 0 709 255 | 5/1996 | European Pat. Off. . |
| 2 340 216 | 9/1977 | France . |
| 36 04 216 | 8/1987 | Germany . |
| 38 25 088 | 2/1990 | Germany . |
| 44 36 162 | 3/1996 | Germany . |
| WO 96 09193 | 3/1996 | WIPO . |

OTHER PUBLICATIONS

Patent Abstracts of Japan; vol. 018, No. 478 (P–1796); Sep. 6, 1994; JP–06–160525 A.

Primary Examiner—Michael J. Zanelli
Attorney, Agent, or Firm—Kenyon & Kenyon

[57] ABSTRACT

In order to allow for a timely and reliable recognition of a rollover event of a vehicle, the angular velocities of the vehicle about the yaw axis, the roll axis, and the pitch axis are measured by way of respective rotation rate sensors. A rollover event is signaled as having been detected if an angular velocity exceeds a definable threshold.

2 Claims, 2 Drawing Sheets

ARRANGEMENT FOR DETECTING MOTOR-VEHICLE ROLL-OVERS

BACKGROUND INFORMATION

The present invention relates to an arrangement for detecting rollover events in vehicles.

If a rollover of a vehicle occurs, all the occupant protection mechanisms installed in the vehicle must be activated in timely fashion. Such occupant protection mechanisms include, for example, rollover bars, belt tensioners front and side airbags, fold-down seat locks in a commercial vehicle, etc. In order for all these protection mechanisms to be activated in timely fashion, it is necessary to detect, as early as possible, whether rotations of the vehicle about its vertical axis (yaw axis), longitudinal axis (roll axis), and transverse axis (pitch axis) will lead to a rollover. To ensure also that the occupant protection mechanisms are in fact activated only in the event of a rollover, incorrect detections of rollovers should be excluded to the greatest extent possible.

German Patent No. 36 04 216 C2 describes a rollover sensor consisting of a fluid-filled space in which a body, suspended in the manner of a pendulum, is located as a seismic mass. By means of an electrical analysis circuit, changes in the position of the pendulum, which can deflect in any direction, yield a datum as to whether or not the vehicle is rolling over. This rollover sensor based on the pendulum principle has the disadvantage on the one hand that it reacts too slowly to vehicle movements, so that a rollover might possibly be signaled too late to activate the occupant protection mechanisms, and on the other hand that a rollover event can be imitated by resonant vibrations of the seismic mass.

European Patent No. 0 430 813 B1 describes a system for vehicle rollover detection which has one rotation rate sensor and three acceleration sensors. The rotation rate sensor measures the angular velocity about the roll axis of the vehicle, and the three acceleration sensors measure the acceleration of the vehicle in the direction of its longitudinal axis, transverse axis, and vertical axis. From the measured angular velocity and the measured accelerations, three variables are derived which are each subjected to a threshold decision. As soon as one of the three variables exceeds the threshold defined for it, a decision is made that a vehicle rollover is about to occur.

SUMMARY OF THE INVENTION

An object of the present invention is to provide an arrangement for detecting a vehicle rollover, with which a rollover can be detected in a timely fashion and with a high reliability.

In the arrangement according to the present invention, three rotation sensors are present for measuring the angular velocities of the vehicle about the yaw axis, the roll axis, and the pitch axis. Also present are means which ascertain, from the measured angular velocities, the position of a vehicular fixed point (for example, the vehicle's center of gravity) projected into a horizontal plane, and which signal a vehicle rollover if the projected point goes beyond the boundaries of a vehicular fixed surface that is also projected into the horizontal plane.

According to the present invention, the rotational energy of the vehicle is calculated from the three measured angular velocities, and a rollover of the vehicle is signaled if the rotational energy exceeds a threshold. In this context, the threshold is that potential energy which is necessary to tilt the vehicle from its instantaneous position into a position in which a vehicular fixed point reaches its maximum distance with respect to the road surface plane. This makes it possible to forecast a vehicle rollover at a very early stage, so that a great deal of time remains to activate protection mechanisms.

DETAILED DESCRIPTION

Figure 1:
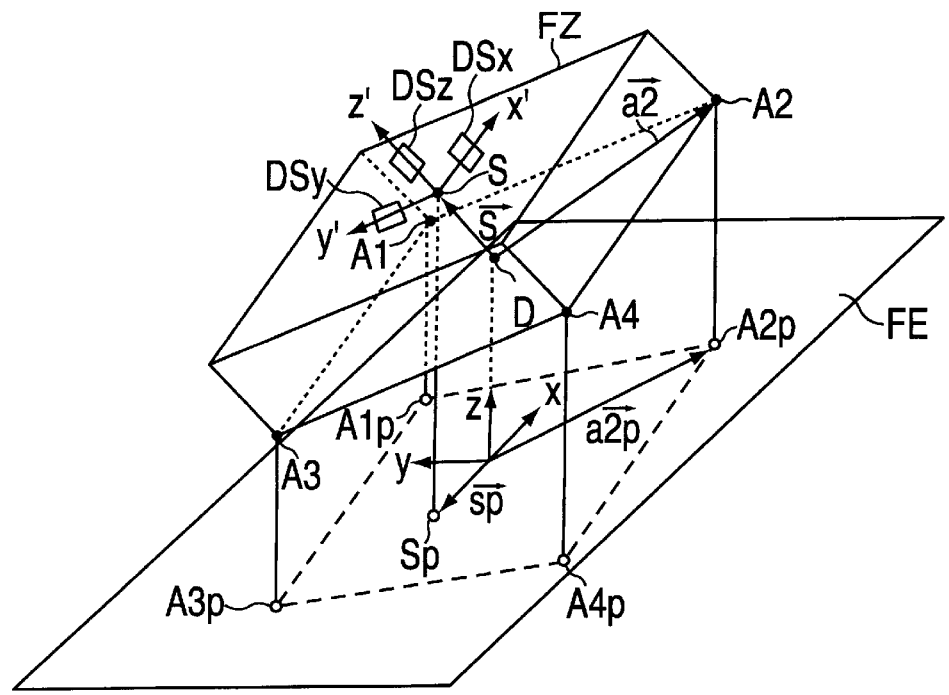
FIG. 1 shows a schematic depiction of a vehicle in accordance with the present invention with a geometry of a first kind for calculating the tilted position of the vehicle.

FIG. 1 schematically depicts a vehicle FZ which is in a tilted position above a horizontal plane FE, preferably the road surface plane. Rotation rate sensors DSx, DSy, and DSx, which measure angular velocities $\omega x$, $\omega y$, and $\omega z$ about roll axis x', pitch axis y', and yaw axis z', are installed in the vehicle. The center of the vehicle's coordinate system x', y', z' is an arbitrarily selected vehicular fixed point S, preferably of the vehicle's center of gravity. As set forth in the flow chart depicted in FIG. 3, the measurement of angular velocities $\omega x$, $\omega y$, $\omega z$ is performed in method step 1.

In method step 2, from the angular velocities $\omega x$, $\omega y$ and $\omega z$ equation (1) is used to calculate the changes over time $\dot\phi x$ and $\dot\phi y$ in gimbal angles $\phi x$ and $\phi y$ with reference to roll axis x' and pitch axis y'.

$$\begin{pmatrix} \dot\phi y \\ \dot\phi x \end{pmatrix} = \begin{pmatrix} 0 & \cos\phi y & -\sin\phi x \\ 1 & \tan\phi y \sin\phi x & \tan\phi y \cos\phi x \end{pmatrix} \begin{pmatrix} \omega x \\ \omega y \\ \omega z \end{pmatrix} \quad (1)$$

Gimbal angle $\phi z$ is not required, because yawing of the vehicle is not relevant for a rollover. In method step 3, gimbal angles $\phi x$ and $\phi y$ are calculated by integrating the changes over time in gimbal angles $\dot\phi x$ and $\dot\phi y$. In method step 4, the transformation matrix T indicated in equation (2) is calculated from gimbal angles $\phi x$ and $\phi y$:

$$T = \begin{pmatrix} \cos\phi y & \sin\phi x \cdot \sin\phi y & \cos\phi x \cdot \sin\phi y \\ 0 & \cos\phi x & -\sin\phi x \\ -\sin\phi y & \sin\phi x \cdot \cos\phi y & \cos\phi x \cdot \cos\phi y \end{pmatrix} \quad (2)$$

For the further calculations, in addition to the vehicle's center of gravity S already mentioned, a vehicular fixed surface is also defined. This vehicular surface spans points A1, A2, A3, and A4 in FIG. 1; these points can, for example, be the wheel contact points of the vehicle. The coordinates of points A1, A2, A3, and A4 with respect to the vehicle's coordinate system (x', y', z') can be described by vectors which proceed from a point D lying in the surface. In FIG. 1, for example, vector $\vec{a}2$ from point D to corner point A2 is indicated. These vectors proceeding from point D) to corner points A1, A2, A3, and A4 possess only x' and y'components, since their origin point D was created by projecting the coordinate intersection point S onto the surface which spans points A1,A2, A3, and A4. Vector from point D to point S has only a z' component. This selection of vectors $\vec{s}$ and $\vec{a}i$ (i=1, 2, 3, 4) results in a minimum of vector components, thus greatly simplifying all further calculations.

As a result of the transformation, performed in method step 5 using the previously calculated transformation matrix T, of the vehicular fixed surface which spans corner points A1, A2, A3, and A4 and of vehicular fixed point S, both the vehicular fixed surface (A1, A2, A3, A4) and vehicular fixed point S are projected into a horizontal plane (plane parallel to the vehicle plane). There thus results, in the horizontal plane, a surface outlined with dashed lines which spans the projected points A1p, A2p, A3p, A4p belonging to points A1, A2, A3, A4. Projected point Sp belonging to vehicular fixed point S also lies in the same horizontal plane. Point D projected onto the horizontal plane constitutes the origin of a coordinate system with axes x, y, and z, the z axis lying in the projection direction. Vectors $\vec{a}ip$ (i=1, 2, 3, 4) proceeding from the origin of this coordinate system x, y, z and leading to corner points A1p, A2p, A3p, and A4p of the projected surface are derived by multiplying the corresponding vectors $\vec{a}i$ of the vehicle's coordinate system by transformation matrix T as defined in equation (2). In the same fashion, vector $\vec{s}p$ describing the location of projected point Sp is constituted by multiplying transformation matrix T by vector $\vec{s}$ in the vehicle's coordinate system. Using vectors $\vec{a}ip$ and $\vec{s}p$ in method step 6, it is possible to decide whether point Sp is located inside or outside the surface which spans points A1p, A2p, A3p, and A4p. If point Sp lies outside that surface, a rollover of the vehicle will definitely occur. A rollover is accordingly signaled in a method step 7, thus activating the occupant protection devices.

Figure 3:
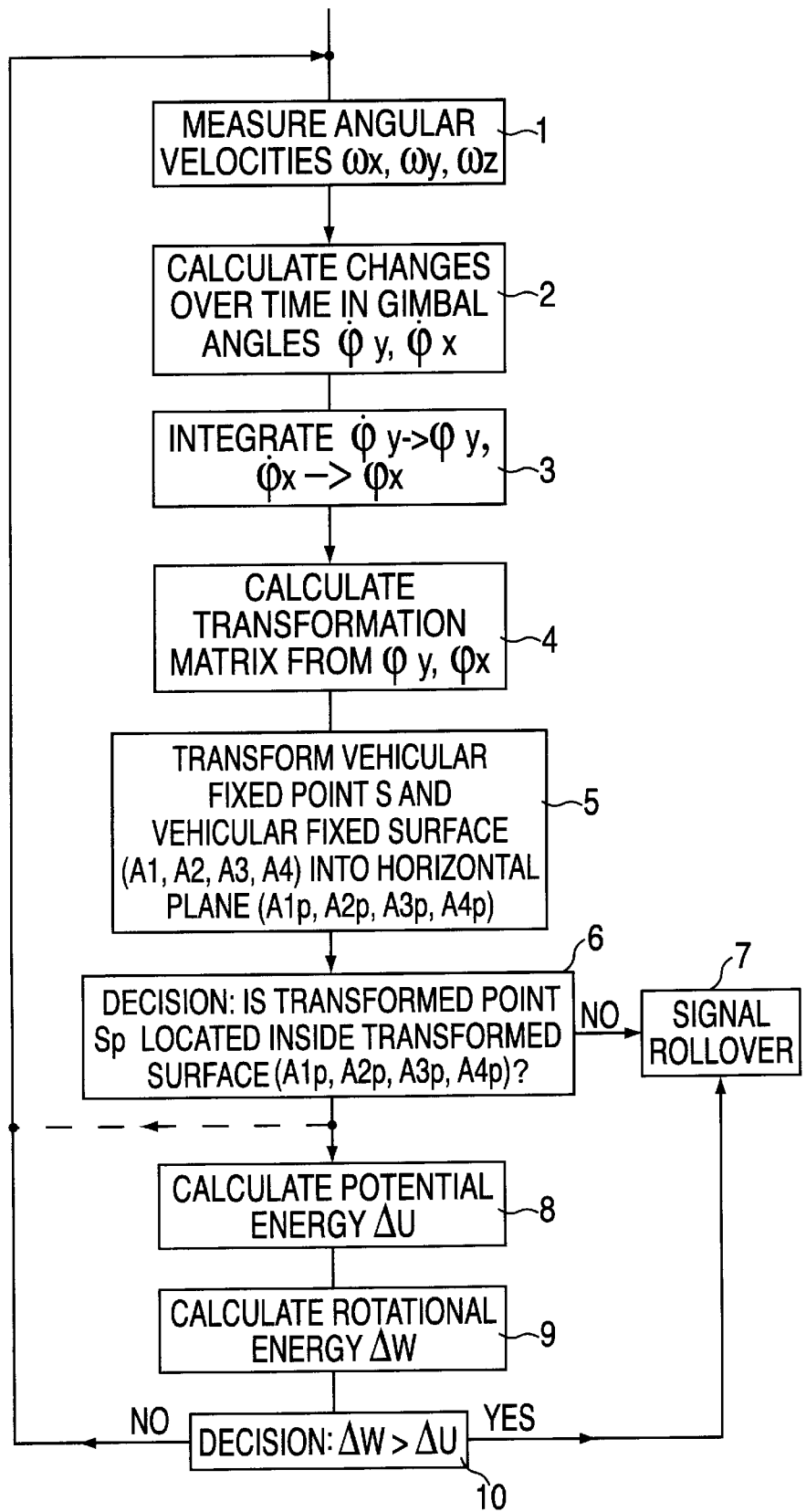
FIG. 3 shows a flow chart representing the steps for determining a rollover datum according to the present invention.

It is evident from FIG. 3 that method step 6 is followed by three further method steps 8, 9, and 10. In these three method steps 8, 9, and 10, a criterion for a rollover is derived using a different procedure. These method steps are either, as depicted in FIG. 3, appended to the calculation method previously described, or are performed alone without the other method, or concurrently with the other method.

Figure 2:
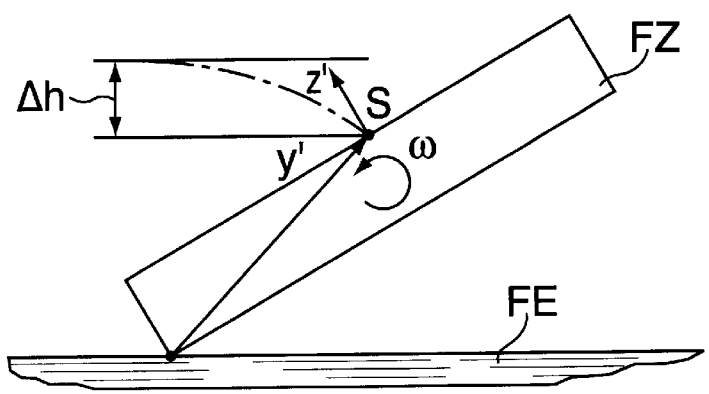
FIG. 2 shows a schematic depiction of a vehicle according to the present invention with a geometry of a second kind for calculating its tilted position.

In method step 8, a calculation is made of a potential energy $\Delta U$ that is necessary to bring the vehicle from its instantaneous position into an unstable position from which the vehicle rolls over. As has been elucidated in FIG. 2, vehicular fixed point S would need, from the instantaneous position depicted, to increase its distance with respect to the horizontal plane FE by a magnitude $\Delta h$. This is because the vehicular fixed point would have reached its maximum distance with respect to horizontal plane FE. If the vehicle should rotate to the point that the vehicular fixed point reaches this maximum distance with respect to horizontal plane FE, a rollover of the vehicle would inevitably occur. Potential energy $\Delta U$ is calculated in method step 8 as defined by equation (3):

$$\Delta U = mg\Delta h \qquad (3)$$

where m is the known mass of the vehicle, and g the acceleration of gravity. The difference $\Delta h$ between the instantaneous distance of vehicular fixed point S with respect to horizontal plane FE and the aforesaid maximum distance can be determined, by simple geometrical calculations, from the vehicle dimensions and from the transformation matrix T that has already been calculated. In the next method step, the rotational energy $\Delta W$ of the vehicle is calculated as defined in equation (4):

$$\Delta w = \frac{1}{2}\Theta\omega^2 \qquad (4)$$

where $\Theta$ designates the moment of inertia of the vehicle, and $\omega$ is an angular velocity about a vehicle axis measured with the rotation rate sensors. In method step 6, a decision is made as to whether the rotational energy $\Delta W$ is greater than the potential energy $\Delta U$. If so, a rollover of the vehicle will definitely occur. A rollover is accordingly signaled so that the occupant protection devices can be activated.

The energy consideration applied in method steps 8, 9, and 10 makes it possible to forecast a rollover of the vehicle at an early stage, so that the occupant protection devices can be activated in timely fashion before the actual rollover occurs.

What is claimed is:

1. An arrangement for detecting a rollover event in a vehicle, comprising:

a first rotation rate sensor for measuring an angular velocity of the vehicle about a roll axis;

a second rotation rate sensor for measuring an angular velocity of the vehicle about a yaw axis;

a third rotation rate sensor for measuring an angular velocity of the vehicle about a pitch axis; and an arrangement for determining a position of a vehicular fixed point projected into a horizontal plane as a function of the angular velocity of the vehicle about the roll axis, the angular velocity of the vehicle about the yaw axis, and the angular velocity of the vehicle about the pitch axis, wherein the arrangement for determining the position of the vehicular fixed point signals the rollover event of the vehicle if the projected vehicular fixed point exceeds boundaries of a vehicular fixed surface projected into the horizontal plane.

2. An arrangement for detecting a rollover event in a vehicle, comprising:

a first rotation rate sensor for measuring an angular velocity of the vehicle about a roll axis;

a second rotation rate sensor for measuring an angular velocity of the vehicle about a yaw axis;

a third rotation rate sensor for measuring an angular velocity of the vehicle about a pitch axis; and an arrangement for calculating a rotational energy of the vehicle as a function of the angular velocity of the vehicle about the roll axis, the angular velocity of the vehicle about the yaw axis, and the angular velocity of the vehicle about the pitch axis, wherein the arrangement for calculating the rotational energy of the vehicle signals the rollover event of the vehicle if the rotational energy of the vehicle exceeds a threshold representing a potential energy for tilting the vehicle from an instantaneous position of the vehicle into a second position where a vehicular fixed point achieves a maximum distance with respect to a road surface plane.

* * * * *